United States Patent Office 3,387,011
Patented June 4, 1968

3,387,011
PRODUCTION OF ORGANOTIN HALIDES
Harold Coates, Wombourn, and Peter Albert Theodore Hoye, Stourbridge, England, assignors to Albright & Wilson (Mfg.) Limited, Oldbury, England, a British company
No Drawing. Filed Dec. 21, 1964, Ser. No. 420,100
Claims priority, application Great Britain, Dec. 31, 1963, 51,322/63
19 Claims. (Cl. 260—429.7)

ABSTRACT OF THE DISCLOSURE

In accordance with certain of its aspects, the novel process of this invention for producing aliphatic tin halide may comprise reacting metallic tin with aliphatic halide, wherein the halide has an atomic number of at least 17, in the presence of a catalyst containing a divalent chalcogen of atomic number of 16–34 thereby forming aliphatic tin halide.

This invention relates to the production of organotin compounds.

The direct reaction of metallic tin with organic halides to produce organotin compounds is one which has not hitherto been achieved except with methyl chloride and certain activated organic halides such as benzyl chloride and alkyl iodides. The reaction of metallic tin with alkyl iodides produces organotin iodides in good yield but is an expensive one to operate involving the use of the costly organic iodides and the economic necessity to recover the iodine from the organotin iodide produced. The ability to carry out the direct reaction of metallic tin with organic chlorides and bromides as a general reaction is a most desirable, but hitherto unattained, concept. Many compounds have been tested as catalysts for the reaction but these have not been found to give satisfactory results. We have also found that many compounds which have been stated to catalyze the reaction of alkyl iodides with metallic tin are substantially ineffective with the corresponding chlorides and bromides.

We have now found that the inclusion in the reaction mixture of compounds which contain as a characterizing feature a divalent sulphur or selenium atom has a marked catalytic effect on the reaction of aliphatic chlorides or bromides with metallic tin. The reaction appears to be entirely a general one and the catalytic effect is exhibited by both inorganic and organic compounds having a divalent sulphur or selenium atom. This catalytic effect appears also to be exhibited when an aliphatic iodide is reacted with metallic tin. The product of the reaction is a mixture of organotin halides in which there predominates the di-organotin dihalide produced by the reaction

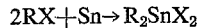

where X represents chlorine, bromine or iodine atoms.

The process of the present invention is, therefore, one for the production of organotin halides which comprises reacting metallic tin or an alloy thereof with an aliphatic chloride, bromide or iodide in the presence of a catalyst containing a divalent sulphur or selenium atom.

By aliphatic halide we mean herein a compound in which a chlorine, bromine or iodine atom is linked to an aliphatic carbon atom. The aliphatic carbon atom may be part of an alkyl group, an aralkyl group or an alkenyl group of the allylic type. Preferred halides for present use are those having from 1 to 20 carbon atoms, particularly the primary alkyl halides such as methyl, ethyl, propyl, butyl, hexyl and octyl chlorides, bromides or iodides; allyl chloride, methallyl chloride and benzyl and nuclear-substituted benzyl chlorides, bromides and iodides may also be employed. Though the reactivities of the bromides and iodides are greater, it is preferred to use the chlorides since these are much less expensive and it is a feature of the present invention that aliphatic chlorides may be employed in the production of organotin halides by the direct reaction therewith of metallic tin or alloys thereof.

The metallic tin may be powdered to increase its surface area or may be in the form of sheet or pieces of granulated metal. Alloys of tin may be used, particularly alloys containing those metals which may function as co-catalysts as described hereinafter.

The compound employed as catalyst is characterized solely by the presence of a divalent sulphur or selenium atom and a wide variety of such compounds may be used as the catalyst for present purposes. Preferably, the catalyst is an organic compound containing a mercapto or substituted mercapto group, for instance, there may be employed mercaptans (RSH) or metal salts thereof, dimercaptans (HS—R'—SH), sulphides (R—S—R''), disulphides (R—S—S—R'') or polysulphides

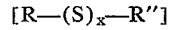

where R and R'' are each hydrocarbon groups (normally having less than 20 carbon atoms), preferably alkyl groups, optionally substituted with inert substituents, for example dialkylamino, alkoxy, alkylthio groups or carboxylic or alkoxycarboxylic acid groups, and R' is a divalent hydrocarbon or substituted hydrocarbon group. Especially preferred sulphur compounds for present use are the alkyl mercaptans and the dialkyl disulphides. The thiocarboxylic acids and esters thereof, for example esters of thioglycollic acid, are also significantly effective. As examples of catalysts of this type there may be mentioned butyl, octyl and dodecyl mercaptans, dibutyl disulphide, dilauryl disulphide, dicetyl disulphide, dibutylaminoethyl mercaptan, butoxyethyl mercaptan, p-chlorphenyl mercaptan, iso-octyl thioglycollate and dibutyl sulphide.

Other sulphur compounds that may be used include those in which the divalent sulphur atom forms part of an acidic grouping, for example as in the salts and esters of the thiophosphorous and thiophosphoric acids, xanthic acid, dithiocarbamic acid and thiocarboxylic acids (RCO.SH), where R is a hydrocarbon or substituted hydrogen group. The two valencies of the sulphur atom may also be linked to the same atom, for example as in the thioamides (RCSNH$_2$), where R is as before, and as in carbon disulphide. As examples of these types of compounds there may be mentioned trilauryl trithiophosphite, dibutyl and dioctyl dithiophosphates and zinc and copper diethyldithiocarbamates and organotin mercaptides. Purely inorganic sulphur compounds containing a divalent sulphur atom have also been shown by us to be effective for present purposes; among such compounds may be mentioned phosphorus pentasulphide, thiourea, sulphur monochloride and even elemental sulphur.

In general selenium compounds are less desirable than their sulphur analogues for commercial use, in view of their nauseating odour. However, any selenium analogues of the aforementioned sulphur compounds may be used, for example an organic hydroselenide (RSeH) or substituted hydroselenide, such as a metal salt (MSer); selenide (R—Se—R''); or diselenide (R—Se—Se—R''), where R and R'' are each as defined above. Organotin selenides may also be used. Preferred selenium compounds for present use are the alkyl hydroselenides and the dialkyl diselenides. As examples of catalysts of this type there may be mentioned di-tridecyl diselenide, butyl, octyl and dodecyl hydroselenides, dibutyl, dilauryl and dicetyl diselenides. Purely inorganic compounds containing a divalent selenium atom have also been shown to be effective for present purposes; among such compounds may be mentioned selenium nonochloride. If desired, the selenium compound may be used in conjunction with a sulphur-containing catalyst as hereinbefore described.

The process of the invention is carried out by heating the tin, aliphatic halide and sulphur and/or selenium catalyst together, usually at elevated temperatures, for example at 50° to 250° C., and preferably at 100° C. to 200° C. It is often convenient to carry out the reaction in a pressure vessel under autogenous pressure. The aliphatic halide is preferably present in considerable stoichiometric excess, preferably about 4 to 5 times the theoretical quantity. Even after heating for 6 to 12 hours the reaction is not complete but the unreacted tin and halide are each readily recoverable for re-use. The catalyst may be used in any desired amount, but an amount of 0.02 to 0.5 mole based on the molar amount of tin present appears to be the optimum quantity.

The reactants and catalyst are usually merely heated together with the excess of the aliphatic halide providing the desired reaction medium, but an additional liquid diluent may be present if desired. Suitable diluents are those which act as inert solvents for the aliphatic halide and include aliphatic ethers or cyclic ethers, for example diethyl ether, dibutyl ether, tetrahydrofuran, ethylene glycol dimethyl ether, ethylene glycol diethyl ether or diethylene glycol dimethyl ether, or liquid hydrocarbons such as hexane, iso-octane, benzene, toluene or xylene. We have also shown that diluents containing hydroxyl groups may be employed, such as for instance alcohols, phenols and ether alcohols such as alkoxy-alkanols and monoalkyl ethers of diethylene glycol, though such active solvents should not be used in too great amount as they have a tendency to undergo condensation reactions with the aliphatic halide or the organotin halide product. However, the presence of small amounts of such active solvents also appears to have a catalytic effect on the process of the invention, as may also the presence of a little water.

It is preferred that the process of the invention be carried out also in the presence of a small amount of at least one co-catalyst which is metallic magnesium, zinc, cadmium, mercury, copper, cobalt, nickel, aluminum, titanium, manganese, iron, calcium, chromium or a compound of such a metal, particularly a salt, alkoxide or mercaptide thereof. Thus the co-catalyst may be present in combination with the sulphur or selenium-containing catalyst, for example as a mercaptide salt or, more particularly, as a thioalkoxy metal halide. Also as co-catalyst there may advantageously be present bromine, iodine, an interhalogen compound such as iodine chloride, iodine trichloride or iodine bromide or a compound which liberates iodine at the reaction temperature employed or, when not present as reactant, an alkyl iodide; in the latter instance the alkyl group of the alkyl iodide is preferably identical with the alkyl group in the aliphatic halide reactant. The preferred co-catalyst is metallic magnesium. Mixtures or combinations of co-catalysts often provide advantageous results, particularly a mixture of metallic magnesium and elemental iodine. The co-catalysts may be employed in an amount up to about 0.1 mole per mole of metallic tin present.

After the reaction has been carried out residual metallic tin is removed from the reaction mixture by filtration, centrifuging or decantation. At such time it is also convenient to remove any insoluble stannous chloride formed as by-product. Residual aliphatic halides may then be removed from the resulting liquid by distillation techniques since the organotin halides are appreciably less volatile, though such distillation may remove the most volatile of the organotin halides, that is the tri-organotin halide, but this can then be separated from the aliphatic halide by hydrolysis to the corresponding organostannoic acid. The residue consists substantially of a mixture of di- and mono-organotin halides and this may be used as such or hydrolysed by aqueous alkali to produce a diorganotin oxide which is insoluble in the alkali and an organostannoic acid soluble in the alkali.

The resulting organotin compounds are valuable intermediates for the production of the organotin compounds which are finding increasing commercial use as stabilizers for synthetic polymeric material, herbicides and fungicides and as catalysts for the production of foamed polyurethane resins.

The invention will now be illustrated by the following examples.

Example 1

A mixture of tin powder (50 g.), n-butyl chloride (175 g.), lauryl mercaptan (13.0 g.), magnesium powder (0.5 g.) and iodine (2.0 g.) was charged to an autoclave fitted with a magnetically operated stirrer and heater. The mixture was agitated for 12 hours at 170° C.

The reaction product was filtered to give unreacted tin (11.25 g.), stannous chloride (8.35 g.) and a liquid fraction which was stripped of volatile compounds by heating to 103° C./15 mm. mercury pressure to yield 94 g. of a mixture consisting largely of butyltin trichloride and dibutyltin dichloride together with a trace of tributyltin chloride (found: Sn 31.9, Cl 27.0%). The yield of butyltin chlorides based on the tin analysis of the product was 77.8% on the tin reacted. The volatile fraction contained butyltin trichloride (4.95 g.), 5.4% yield on the tin which reacted.

Example 2

Tin powder (50 g.), n-butyl chloride (219 g.), n-butyl mercaptan (5.5 g.) and magnesium powder (0.5 g.) were placed in an autoclave and a solution of iodine (2.0 g.) in n-butyl chloride (175 g.) added. The autoclave was sealed, purged with nitrogen and heated at 170° for 22 hours. After allowing to cool to room temperature, the reaction product was filtered to remove insoluble matter. The autoclave and insoluble matter were washed with butyl chloride (100 g.) and the washings added to the bulk. The insoluble matter contained unreacted tin (7.0 g.) and stannous chloride (3.3 g.). The butyl chloride solution was stripped to 60° C./14 mm. leaving 99.3 g. of a mixture of monobutyltin trichloride and dibutyltin dichloride having an analysis Sn 32.5%, Cl, 27.8%. The yield of butyltin compounds was 75% on the tin which reacted.

Treatment of the reaction product (82.4 g.) with an aqueous solution of sodium hydroxide gave dibutyltin oxide (33.2 g.) (found: Sn, 47.2%). The aqueous solution was neutralised to yield butylstannoic acid (18.1 g.) (found: Sn 52.9%).

Example 3

A mixture of tin powder (50 g.), n-butyl bromide (314 g.), magnesium powder (0.502 g.), iodine (2.0 g.) and lauryl mercaptan (12.9 g.) was sealed in an autoclave as in Example 1 and agitated at 140° C. for 6 hours.

The reaction product was filtered and the solid washed with butyl bromide (240 g.) and dried to give unreacted tin 8.0 g. and stannous bromide 1.7 g.

The combined butyl bromide washings were stripped to 127° C./15 mm. to yield 155 g. butyltin bromides (found: Sn 25.9%, Br 42.1%) equivalent to a 95.7% yield on the tin consumed. Thin layer chromatography of the product showed it to consist largely of dibutyltin dibromide together with a little monobutyltin tribromide.

Example 4

Tin powder (50 g.), magnesium (0.5 g.), phenol (50 g.), butyl chloride (87 g.) and iodine (2 g.) were placed in an autoclave and a solution of butyl mercaptan (5.5 g.) in butyl chloride (260 g.) added. The mixture was heated for 12 hours at 170° C. with agitation and for a further 7 hours at 170° C. without agitation.

The reaction mixture was filtered to give solid material (20.5 g.) containing 0.5 g. unreacted tin and 7.5 g.

stannous chloride. The filtrate was stripped of volatiles to 70° C./14 mm. leaving 220.5 g. of a mixture consisting mainly of monobutyltin trichloride, dibutyltin dichloride and butyl phenyl ether (found: Sn, 14.9%, i.e. a yield of 67% on the tin used). The volatiles contained 4.5 g. tin as monobutyltin trichloride, 9% yield on tin.

Example 5

Tin powder (50 g.), magnesium powder (0.5 g.), 2-butoxyethanol (50 g.), iodine (2.0 g.) butyl chloride (347 g.) and butyl mercaptan (5.5 g.) were charged to an autoclave. The mixture was agitated at 170° C. for 17 hours.

The reaction mixture was filtered to give 29.8 g. of a solid. The filtrate was stripped to 125° C. at atmospheric pressure to leave 126 g. of mixed butyltin compounds.

Example 6

Tin powder (50 g.), dibutyl ether (50 g.), magnesium (0.5 g.), butyl mercaptan (5.5 g.) iodine (2.0 g.) and butyl chloride (340 g.) were charged to an autoclave. The mixture was agitated at 170° C. for 14 hours.

The reaction mixture was filtered to give 32.6 g. of unreacted solid which contained 10.1 g. elemental tin. The filtrate was stripped to yield 61.5 g. organotin residue containing 35.2% tin (58.7% yield on the tin reacted). The recovered butyl ether/butyl chloride fraction contained 1.0 g. tin which was present as butyltin trichloride (2.5% yield on the tin reacted).

Example 7

Tin powder (50 g.), dioctyldithiophosphate (21 g.) iodine (2 g.), magnesium (0.5 g.) and butyl chloride (394 g.) were treated as in Example 2. There was obtained 14.8 g. of a product insoluble in butyl chloride. The soluble reaction product after stripping weighed 132.7 g. (Found: Sn 28.4%, S 3.2%). Yield of organotin compounds=75.2% on the tin used. The recovered butyl chloride contained 2.3 g. of tin as monobutyltin trichloride, a yield of 4.6% on the tin used.

Example 8

A Grignard reagent was prepared from magnesium (6 g.), butyl iodide (51 g.) in diethylether (150 mls.). Lauryl mercaptan 105 g. was added dropwise to the well stirred Grignard solution. The resulting solution of lauryl mercapto magnesium iodide was heated to 100° under vacuo to remove ether giving 160 g. of a creamy product.

Tin powder (50 g.), octyl chloride (210 g.) and the preformed combination of catalyst and co-catalyst (13.3 g.) were stirred together at reflux for 26 hours. The product was cooled and filtered to give a solid which contained unreacted tin (7.1 g.) and stannous chloride (6.0 g.). The filtrate was washed with dilute hydrochloric acid. Stripping to 150° C. under a pressure of 14 mm. mercury gave a very pale brown product (121.7 g.) which crystallised at room temperature (found: Sn, 22.6%; Cl, 14.9%; sulphur 1.5%).

Example 9

Tin powder (50 g.), magnesium (0.5 g.), allyl chloride (50 ml.), lauryl mercaptan (12 g.), iodine (1.5 g.) and xylene (300 mls.) were stirred together at reflux. The initial reflux temperature measured in the solution was 80° C. The reaction mixture became green and then grey. During 4 hours the temperature rose steadily to 105° C. Thereafter small amounts of allyl chloride were added at intervals to keep the temperature between 100 and 105° C. The total reaction time was 21 hours. The amount of allyl chloride used was 130 ml. Excess of allyl chloride was distilled out to a flask temperature of 138° C. The product was filtered giving 0.5 g. unreacted tin and 1.0 g. $SnCl_2$. The clear, pale brown, xylene solution (320 g.) contained Sn (14.9%), representing a 95.2% conversion of tin to alkyltin chlorides.

Example 10

Tin powder (50 g.), magnesium (0.5 g.), iodine (2.0 g.), dibutyl disulphide (11.6 g.) and butyl chloride (450 ml.) were reacted in an autoclave as in Example 2 for 12 hours at 170° C.

There was obtained 3.5 g. of a solid substance, an organotin-containing product (138 g.) (found: Sn, 30.7%; sulphur 2.9%) corresponding to 84.8% yield on tin used, and recovered butyl chloride which contained 2.6 g. tin as butyltin trichloride (5.2% yield). Hydrolysis of the organotin product (60 g.) as described in Example 2 gave dibutyltin oxide (16.7 g.) and butyl stannoic acid (19.1 g.).

Example 11

Example 10 was repeated but using dioctyldithiophosphate (21 g.) in place of dibutyldisulphide. The organotin product (132.7 g.) contained tin, 28.4% and sulphur 3.2%. The recovered butyl chloride contained 2.3 g. tin as butyltin trichloride. The yield of butyltin chloride was 79.8% on the tin used.

Example 12

Example 10 was again repeated but using phosphorus pentasulphide (7.2 g.) in place of dibutyldisulphide. There was obtained 138.6 g. of organotin product.

Example 13

Example 10 was again repeated but using sulphur chloride (8.8 g.) in place of dibutyldisulphide. The weight of organotin product was 126 g.

Example 14

Example 10 was again repeated using dibutyl sulphide (9.5 g.) in place of dibutyldisulphide. The weight of organotin product was 81 g. (found Sn, 28.4%).

Example 15

Example 10 was again repeated but using sulphur (2.1 g.) in place of dibutyldisulphide. The weight of organotin product was 53.5 g. (found: Sn, 22.2%).

Example 16

Example 10 was again repeated but using thiourea (5.0 g.) in place of dibutyldisulphide. The weight of organotin product was 106 g.

Example 17

Butyl iodide (112 g.), tin powder (30 g.), magnesium (0.1 g.) and zinc diethyldithiocarbamate (1.0 g.) were stirred together at 130–135° C. for 2 hours. All the tin reacted. The product was distilled to give dibutyltin diiodide (105 g.=85.6% yield) having a B.P. 130° C./0.2 mm.

Example 18

Example 17 was repeated but using dibutyl disulphide (5.5 g.) in place of zinc diethyldithiocarbamate. There was obtained 119 g. of dibutyltin di-iodide (96.8% yield) having B.P. 130–132° C./0.2 mm.

Example 19

Tin foil (54 g.), dilauryl disulphide (16 g.), octyl chloride (254 g.) and iodine (0.2 g.) were heated together under reflux at 181° C. for 46 hours. The product was filtered giving unreacted tin (4.0 g.), stannous chloride (7.8 g.) and an octyl chloride solution of octyltin chlorides. This solution was stripped to 160° C. under a pressure of 14 mm. mercury to yield 157.5 g. of product which was a very pale yellow oil which crystallized readily at room temperature (found: Sn, 25.8%, 81% yield of octyl tin chlorides on the tin reacted).

Example 20

Example 1 was repeated except that granulated tin was used in place of tin powder. After stripping the product there was obtained 160.6 g. of mixed butyltin chlorides (found: Sn, 25.0%). The recovered butyl chloride contained 4.4 g. tin as butyltin trichloride giving a total yield of organotin on tin used of 89%. Tin (4.1 g.) was recovered unreacted.

Example 21

Example 1 was repeated but tin foil (50 g.) was used and the lauryl mercaptan was replaced by isooctyl thioglycollate (13.0 g.). The weight of stripped product was 146.8 g. (found: Sn, 23.8%). The recovered butyl chloride contained 2.2 g. tin as butyltin trichloride giving a total yield of organotins on tin used of 74%.

Example 22

Tin foil (50 g.), octyl chloride (250 g.) and dicetyl disulphide (20 g.) were heated under reflux for 24 hours. The reaction product was cooled, and the unreacted tin (19.0 g.) filtered off. The unreacted tin was washed with petroleum ether and the washings added to the product.

Distillation gave a little hexadecane, monooctyltin trichloride B.P. 112°/0.1 mm. Hg pressure and dioctyltin dichloride B.P. 166°/0.1 mm. Distillation was continued until the distillation temperature reached 175° C. The dioctyltin dichloride crystallized in the condenser during distillation. The combined weight of hexadecane, monooctyltin trichloride and dioctyltin dichloride was 131.5 g. and the weight of dicetyl disulphide distillation residue 17.0 g.

Example 23

Tin foil (50 g.), octyl chloride (250 g.), di-tridecyl diselenide (10 g.) and iodine (0.5 g.) were heated at reflux with stirring for 21 hours. Unreacted tin (13.2 g.) and stannous chloride (2.2 g.) were separated off. The organic solution was stripped to 150° C./12 mm. mercury pressure giving a pale yellow product which crystallized readily at room temperature. (Found: Sn 24.8%, Cl 16.2%, which corresponds to a mixture of 82% dioctyltin dichloride and 18% mono-octyltin trichloride.) The yield of octyltin chlorides was 90.0% based on the tin which reacted.

Example 24

Tin foil (50 g.), octyl chloride (300 ml.), di-tridecyl-diselenide (10 g.) and iodine (0.5 g.) were heated together under reflux for 24 hours at 180° C. The product was filtered and the solid residue washed with petroleum ether and then methylated spirit. The weight of unreacted tin was 2.4 g. Titration of the methylated spirit wash indicated the presence of 0.1 g. tin as $SnCl_2$. The combined product and petroleum ether wash was stripped to 150° C./15 mm. mercury pressure leaving a yellow liquid (179.8 g.) which crystallized readily at room temperature (Found: Sn 25.4%, Cl 15.9%.) The product was shown by thin-layer chromatographic analysis to consist largely of dioctyltin dichloride, together with a little mono-octyltin trichloride. The volatile fraction from the stripping contained 0.625 g. tin as octyltin trichloride.

The yield of octyltin chlorides was 97.5% on the tin which reacted.

Example 25

Tin foil (50 g.), octyl chloride (297 g.), di-tridecyl diselenide (5 g.), magnesium (0.5 g.) iodine (0.5 g.) were treated as in Example 2. Tin metal 29.4 g. was recovered uncharged. Stripping the organic solutions gave 77 g. of octyltin chlorides (found: Sn 22.7%, Cl 16.2%) and a distillate which contained 1.4 g. tin as mono-octyltin trichloride. The yield of organotin compounds was 91.8% on the tin which reacted.

What we claim is:

1. The process of producing aliphatic tin halide which comprises reacting metallic tin with aliphatic halide, wherein the halide has an atomic number of at least 17, in the presence of a catalyst containing a divalent chalcogen of atomic number of 16–34 thereby forming aliphatic tin halide.

2. The process of producing aliphatic tin halide claimed in claim 1 wherein said catalyst contains divalent sulphur.

3. The process of producing aliphatic tin halide claimed in claim 1 wherein said catalyst contains a mercaptan.

4. The process of producing aliphatic tin halide claimed in claim 1 wherein said catalyst contains an organic mercaptide.

5. The process of producing apilhatic tin halide claimed in claim 1 wherein said catalyst contains lauryl mercaptan.

6. The process of producing aliphatic tin halide claimed in claim 1 wherein said catalyst contains dibutyl sulphide.

7. The process of producing aliphatic tin halide claimed in claim 1 wherein said catalyst contains dibutyl disulphide.

8. The process of producing aliphatic tin halide claimed in claim 1 wherein said catalyst contains divalent selenium.

9. The process of producing aliphatic tin halide claimed in claim 1 wherein said catalyst contains a selenide.

10. The process of producing aliphatic tin halide claimed in claim 1 wherein said catalyst contains an organic selenide.

11. The process of producing aliphatic tin halide claimed in claim 1 wherein said catalyst contains an alkyl selenide.

12. The process of producing aliphatic tin halide claimed in claim 1 wherein said catalyst contains tri-decyl diselenide.

13. The process of producing aliphatic tin halide which comprises reacting metallic tin with aliphatic halide, wherein the halide has an atomic number of at least 17, in the presence of a catalyst containing a divalent chalcogen of atomic number of 16–34 and at least one co-catalyst selected from the group consisting of metallic magnesium, zinc, cadmium, mercury, copper, cobalt, nickel, aluminium, titanium, manganese, iron, chromium, compounds of said metals, bromine, iodine, interhalogen compounds, and when not present as reactant alkyl iodide.

14. The process of producing aliphatic tin halide, including aliphatic tin dihalide, which comprises reacting at 50° C.–250° C. metallic tin with aliphatic halide, wherein the halide has an atomic number of at least 17, in the presence of a catalyst containing a divalent chalcogen of atomic number of 16–34 thereby forming aliphatic tin halide.

15. The process of producing tin halide, including aliphatic tin dihalide, which comprises reacting metallic tin with aliphatic halide, wherein the halide has an atomic number of at least 17, in the presence of a catalyst containing 0.02–0.5 moles of a divalent chalcogen of atomic number of 16–34, per mole of metallic tin, thereby forming aliphatic tin halide.

16. The process of producing a butyltin chloride which comprises reacting metallic tin with butyl chloride in the presence of a mercaptan catalyst.

17. The process of producing a butyltin chloride which comprises reacting metallic tin with butyl chloride in the presence of a mercaptan catalyst and a co-catalyst comprising metallic magnesium.

18. The process of producing an octyltin chloride which comprises reacting metallic tin with octyl chloride in the presence of a catalyst containing a diselenide.

19. The process of producing an octyltin chloride which comprises reacting metallic tin with octyl chloride in the presence of di-tridecyldiselenide catalyst and a co-catalyst comprising iodine.

References Cited

UNITED STATES PATENTS 3,085,102   4/1963   Yatagai et al. _____ 260—429.7

TOBIAS E. LEVOW, Primary Examiner.

W. F. W. BELLAMY, Assistant Examiner.